March 13, 1956  R. G. MILLER  2,737,657
CHUCK
Filed Jan. 13, 1954
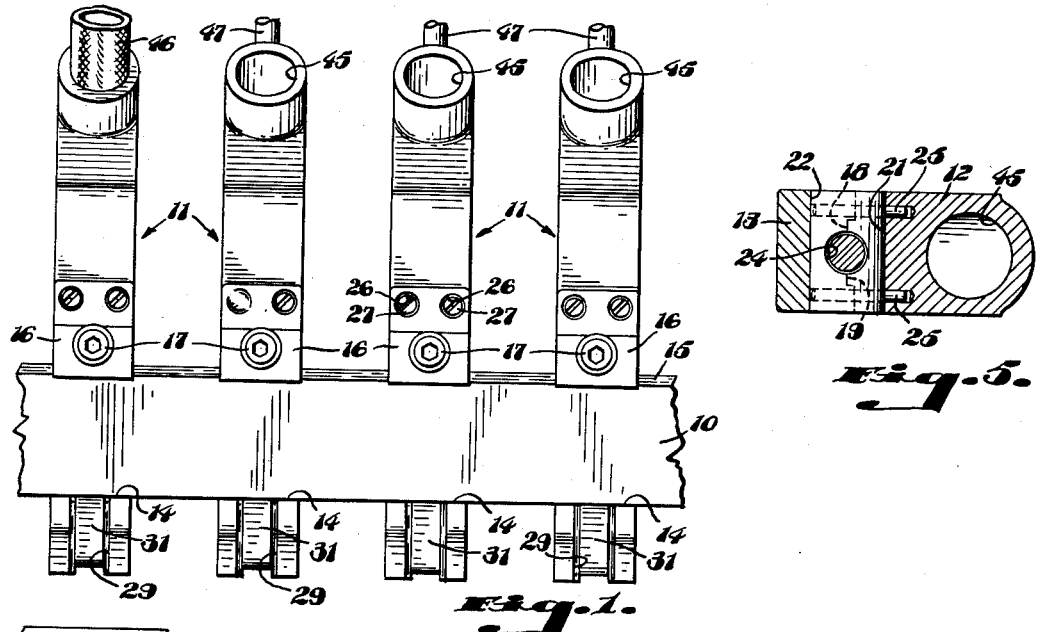
INVENTOR.
ROBERT G. MILLER,
BY:
Harold B. Hood
ATTORNEY.

United States Patent Office 2,737,657
Patented Mar. 13, 1956

2,737,657

CHUCK

Robert G. Miller, Wabash, Ind., assignor to The G. M. Diehl Machine Works, Inc., Wabash, Ind., a corporation of Indiana Application January 13, 1954, Serial No. 403,749

4 Claims. (Cl. 1—5)

The present invention relates to a chuck for use primarily in a mechanical nailing machine in which a plurality of such chucks is moved into engagement with a work-piece and the nails are thereafter driven into such work-piece.

Such a machine is usually provided with some form of mechanism for delivering nails serially to the chucks therein and with ram means for driving the nails out of the chucks into the work-piece. It very often happens that more than one nail will be released into the chuck upon actuation of such mechanism, and when this happens, the nails will jam the chucks upon movement of the ram means. It is, therefore, necessary to construct the chuck in such a way that it can be opened to clear such jams. It is the primary object of this invention to provide a chuck of the above type which will yield upon the occurrence of any condition which would ordinarily cause a jam therein to prevent damage to the chuck.

A further object is to provide means for mounting a chuck of the above-mentioned type in a nailing machine, such means being constructed to facilitate the removal and replacement of the chuck for repair purposes or for the purpose of changing to a different size chuck.

Another object is to provide such a chuck in which the jaw members are formed in such a way that the portions thereof engaging the nails will provide greatly improved supporting surfaces for a nail passing between such jaws.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a front elevation showing a plurality of chucks supported on a bar member carried by a machine of the type under construction;

Fig. 2 is a side elevation, partially in section, showing one of the chucks of Fig. 1 together with a portion of the machine used for actuating the ram member of the chuck;

Fig. 3 is a longitudinal sectional view, similar to Fig. 2, showing the ram member in an intermediate position in which a nail is driven partially out of the chuck;

Fig. 4 is a view similar to Fig. 3 but showing the chuck in a position in which a jam would ordinarily occur;

Fig. 5 is a transverse sectional view through the chuck of Fig. 2 and taken substantially on the line 5—5 thereof; and Fig. 6 is a partial sectional view of the lower end of the chuck of Fig. 2, but drawn to a greatly enlarged scale.

Referring more particularly to the drawings, and especially to Fig. 1, I have illustrated the supporting member, provided by a machine of the type under consideration, comprising a bar member 10. A plurality of chucks 11 is supported on said bar member for movement toward and away from a work-piece. Each such chuck comprises a pair of mating body portions 12 and 13, portion 12 being provided with a transverse slot 14 for the reception therein of bar member 10. Said bar member is provided with a chamfered edge 15 remote from body portion 13, and a wedge member 16 is adapted to engage said edge and the adjacent surface of the slot 14. A screw 17 passes through wedge member 16 and is threadedly received in a suitable pocket in body portion 12 to fix said body portion securely to bar member 10.

Body portion 12 is provided with a planar surface 18 engageable with a planar surface 19 on body portion 13, and a bore 20 is provided in the chuck 11 with its axis lying substantially in the plane of the surfaces 18 and 19. It will be seen that the two body portions 12 and 13 cooperate to provide said bore and, upon separation of body portions 12 and 13, bore 20 will be opened along its axis for a purpose soon to become apparent.

Body portion 12 is provided with a semi-cylindrical groove 21 near one end thereof, and body portion 13 is provided with a mating groove 22, such grooves cooperating, when said body portions are in their illustrated positions, to provide a further bore through chuck 11 upon an axis lying substantially in the plane of the body surfaces 18 and 19 and substantially normal to the axis of bore 20. A cylindrical element 23 is snugly received in said bore and, preferably, is fixed to body portion 12 by means of pins 25, 25, or the like. Cylindrical element 23 is provided with a transaxial bore 24 substantially coaxial with bore 20, for a purpose later to become apparent.

Body portion 12 is provided with one or more sockets 26 each receiving therein a screw 27 penetrating body portion 12 and threadedly received in a suitable tapped bore in body portion 13. A coiled spring 28 is sleeved on screw 27 and confined between the bottom of socket 26 and the head of screw 27. Thus, it will be seen, that body portions 12 and 13 are held resiliently in mating engagement along surfaces 18 and 19, respectively, but are yieldable to permit the swinging of body portion 13 away from body portion 12 about the axis of the cylindrical element 23. The tension on spring 28 can, of course, be varied by adjustment of screw 27.

In the end of body portion 12 remote from cylinder 23, I provide a socket 29. A similar socket 30 is provided in the adjacent end of body portion 13. A jaw member 31 is received in socket 29 and pivoted to body portion 12 for swinging movement about an axis 32. A similar jaw member 33 is similarly received in socket 30 and pivoted for swinging movement about an axis 34. The two said jaw members cooperate at one end to close the adjacent end of bore 20 in a manner later to be described. A coiled spring 35 engages the opposite end of jaw member 31, and a similar coiled spring 36 engages the opposite end of the jaw member 33 to urge said one ends of said jaw members into such bore-closing cooperation.

Jaw member 31 is provided with a surface 37 engageable with a similar surface 38 on jaw member 33 substantially in the plane of the surfaces 18 and 19 on body portions 12 and 13. Jaw member 31 has formed therein a semi-cylindrical groove 39 cooperable with a similar groove 40 in jaw member 33 to provide a cylindrical socket substantially coaxial with the bore 20 and registrable with the end of said bore remote from the cylindrical element 23.

Jaw member 31 is provided further with a tapered groove 41 opening through surface 37 and cooperating with a similar tapered groove 42 opening through surface 38 in jaw member 33 to provide, when said jaw members are in mating engagement, a passage substantially coaxial with body bore 20 and tapering in the direction away from said body bore. The bottom of socket 39, 40 is tapered, as at 43, 44 to merge with the adjacent end of passage 41, 42.

Body portion 12 is provided with a port 45 communicating with bore 20 intermediate the ends thereof, and a flexible conduit 46 is connected to said port and communicates with a mechanism (not shown) in the machine for delivering nails serially to chucks 11. Upon actuation of such mechanism a single nail 49 is released and falls through the conduit 46, through port 45 and into bore 20 to come to rest against the jaw members 31 and 33 (see Fig. 6).

The machine is provided with a bar 48 movable relative to the chuck 11 and said bar supports a ram member 47 for each of the chucks 11. Said ram member is in the form of a rod and one end thereof projects through the bore 24 in the cylindrical element 23 and is received in bore 20 for reciprocation therein past port 45 toward and away from jaw members 31 and 33.

After a nail 49 has been released into bore 20 and the chuck 11 has been moved into work-engaging position, the ram 47 is moved downward to engage the head of the nail 49 to drive it through the tapered passage 41, 42 spreading the jaw members 31 and 33. I have found that with a taper of substantially three degrees in the passage 41, 42 the surfaces of such passage will lie substantially in engagement with the periphery of the nail 49 as the nail passes between the jaw members. As the end of ram 47 engages the tapered socket-end 43, 44 of the jaw members, the jaw members will, of course, yield to permit the passage of said ram member therebetween to set nail 49 solidly in the work-piece. Without the provision of the taper in the passage 41, 42, upon separation of jaw members 31 and 33 there would be only line contact between the jaw members and the periphery of nail 49. With the provision of the taper, however, there will be surface contact substantially throughout the lengths of passage 41, 42, as shown in Fig. 3, thereby substantially increasing the stability of the nail as it is driven toward the work-piece.

In the event of a bent nail being delivered into bore 20, or in the event of more than one nail being released into said bore, body portions 12 and 13 will pivot about the hinge means provided by the cylindrical element 23 to permit the imperfect nail or plurality of nails to be removed before actuation of the ram member 47. Should the ram member be actuated before such removal, the body portions 12 and 13 will be spread, as the ram member is actuated, to prevent jamming of the nails in the bore 20. Damage to the chuck 11 and the ram 47 is thereby prevented. This spreading is illustrated in Fig. 4. It will be noted that, in extreme cases, the screw 27 will be somewhat flexed; but this flexure does not exceed the elastic limit of the screw.

While I have described the chuck in connection with a nailing machine, it will be obvious that it would be equally useful in any type of machine in which elements are fed serially to the chuck to be forced therefrom by means of a plunger or the like, and it is not intended that such reference to a nailing machine should constitute a limitation to the claims herein.

I claim as my invention:

1. In a machine of the class described, a chuck comprising a pair of mating body portions normally engageable with each other in a common plane, said body portions cooperating to provide a single bore opening through the opposite ends thereof with its axis lying substantially in said common plane when said body portions are so engaged, one of said body portions being formed to provide a port communicating with said bore intermediate the ends thereof, hinge means near one end of said body portions and supporting one of said body portions on the other of said portions for swinging movement of said one body portion relative to the other of said portions about an axis substantially parallel to said common plane and substantially normal to the axis of said bore, means resiliently engaging said body portions to hold said one portion yieldingly in such engagement with said other portion, a pair of mating jaw members pivotally supported near the ends of said body portions opposite said hinge means for swinging movement of one end of each thereof into and out of mating engagement substantially in said common plane to block the end of said bore remote from said hinge means, means resiliently engaging said jaw members to urge them toward such mating engagement, and a ram member having one end thereof received through the end of said bore near said hinge means for reciprocation of said ram member end toward and away from said jaw members past said port, said body portions cooperating to provide a second bore near the ends thereof opposite said jaw members with its axis lying substantially in said common plane substantially normal to the axis of the first-said bore, said hinge means comprising a cylindrical element snugly received in said second bore and having a transaxial bore substantially coaxial with the first-said bore to permit projection of said ram member through said cylindrical element.

2. In a machine of the class described, a chuck comprising a pair of elongated mating body portions normally engageable with each other in a common plane, said body portions cooperating to provide a single, longitudinal bore throughout the length thereof with its axis lying substantially in said common plane when said body portions are so engaged, one of said body portions being formed to provide a port communicating with said bore intermediate the ends thereof, and further being provided with a semi-cylindrical rib near one end thereof with the axis of said rib lying substantialy in said common plane substantially normal to the axis of said bore and having a transaxial bore substantially coaxial with said single bore, the other of said body portions being formed to provide a semi-cylindrical groove near one end thereof for reception therein of said rib to form hinge means for swinging said other body portion toward and away from said one body portion about the axis of said rib, means resiliently engaging said body portions to hold said other body portion yieldingly in mating engagement with said one body portion, a rod having one end thereof passing through said transaxial rib bore and reciprocably received in said single bore for movement of said end toward and away from the opposite ends of said body portions past said port, jaw members supported on each of said body portions for swinging movement into and out of engagement substantially in said common plane near said opposite body portion ends, and means resiliently engaging said jaw members to urge them toward such engagement to close said single bore but yieldable to permit them to be moved to open said bore.

3. In a machine of the class described, a chuck comprising a body member having a longitudinal bore therethrough and a port communicating with said bore intermediate the ends thereof, a rod received through one end of said bore and reciprocable therein toward and away from the other end of said bore past said port, a pair of jaw members supported on said body member for movement of one end of each thereof into and out of mating engagement with each other in a plane lying substantially in the axis of said bore to close said other end of said bore, said one ends of said jaw members each being formed with a tapered groove cooperating, when said jaw member ends are in such engagement, to provide a passage substantially coaxial with said body bore and tapering in the direction away from said one end of said body bore, and means resiliently engaging said jaw members to hold them yieldingly in such bore-closing engagement, said body member being split along a plane through the axis of the bore therein and substantially in the plane of engagement of said jaw member ends to provide mating body portions, and hinge means near said one end of said body member supporting one of said mating body portions on the other of said portions for relative swinging movement of said body portions toward and away from each other about an axis lying substantially in said plane and substantially normal to the axis of said bore, and means resiliently engaging said body portions to hold them yieldingly against such swinging movement, one of said body portions being provided with a semi-cylindrical rib near said one end of said body member with its axis lying substantially in said plane substantially normal to the axis of said bore, and the other of said body portions being provided with a semi-cylindrical groove adapted to receive said rib on said one body portion to constitute said hinge means, said rib being formed with a bore substantially coaxial with said body member bore to permit the passage of said rod through said rib into said body member bore.

4. In a machine of the class described, a chuck comprising a body member having a longitudinal bore therethrough and a port communicating with said bore intermediate the ends thereof, a rod received through one end of said bore and reciprocable therein toward and away from the other end of said bore past said port, a pair of jaw members supported on said body member for movement of one end of each thereof into and out of mating engagement with each other in a plane lying substantially in the axis of said bore to close said other end of said bore, said one ends of said jaw members each being formed with a tapered groove cooperating, when said jaw member ends are in such engagement, to provide a passage substantially coaxial with said body bore and tapering in the direction away from said one end of said body bore, and means resiliently engaging said jaw members to hold them yieldingly in such bore-closing engagement, said body member being split along a plane through the axis of the bore therein and substantially in the plane of engagement of said jaw member ends to provide mating body portions, and hinge means near said one end of said body member supporting one of said mating body portions on the other of said portions for relative swinging movement of said body portions toward and away from each other about an axis lying substantially in said plane and substantially normal to the axis of said bore, and means resiliently engaging said body portions to hold them yieldingly against such swinging movement, each of said body portions being provided with a semi-cylindrical groove cooperable with such groove in said other body portion to provide a further bore through said body member substantially normal to the axis of the first-said bore, and a cylinder snugly received in said further bore to constitute said hinge means rib, said cylinder having a transaxial bore registrable with said body member bore to permit the passage of said rod through said cylinder into said bore.

References Cited in the file of this patent

UNITED STATES PATENTS

| | | |
|---|---|---|
| 461,014 | Doig | Oct. 13, 1891 |
| 575,198 | Atwood | Jan. 12, 1897 |
| 587,321 | Morgan | Aug. 3, 1897 |
| 619,901 | Morgan | Feb. 21, 1899 |
| 2,240,516 | Paxton | May 6, 1941 |
| 2,416,312 | Harkeem | Feb. 25, 1947 |
| 2,557,757 | Paxton | June 19, 1951 |